United States Patent Office 3,337,501
Patented Aug. 22, 1967

3,337,501
MANGANESE AND COBALT SALT-AMINE COMPLEX CATALYSTS IN POLYPHENYLENE ETHER FORMATION
Jan Bussink, Otto Ernst van Lohuizen, and Leo Vollbracht, Arnhem, Netherlands, assignors to N.V. Onderzoekingsinstituut Research, Arnhem, Netherlands, a corporation of the Netherlands
No Drawing. Filed Mar. 12, 1965, Ser. No. 439,449
Claims priority, application Netherlands, Mar. 27, 1964, 64—3,374, 64—3,375
7 Claims. (Cl. 260—47)

ABSTRACT OF THE DISCLOSURE

Polyarylene ethers from certain 2,6-disubstituted phenols, and preferably 2,6-dimethylphenol, are prepared by reacting the 2,6-disubstituted phenol with oxygen in the presence of a catalyst consisting of a complex manganese salt-amine compound or a complex cobalt salt-amine compound, and in the absence of a catalyzing amount of any complex copper salt-amine compounds.

---

The present invention relates to a process for the preparation of polyarylene ethers by reacting a 2,6-disubstituted phenol with oxygen in the presence of a catalyst consisting of certain complex metal salt-amine compounds.

Such a process, broadly, is known from British Patent No. 930,993. In the process described in that patent, the catalyst consists of a complex copper salt-amine compound.

In accordance with the present invention, it has now been found that it is also possible to use complex metal salt-amine compounds other than complex copper salt-amine compounds. The process according to the present invention is characterized by the use as a catalyst of a complex manganese salt-amine compound or a complex cobalt salt-amine compound in the absence of complex copper salt-amine compounds.

The use of complex manganese salt-amine compounds or complex cobalt salt-amine compounds has advantages over the known use of complex copper salt-amine compounds. If use is made of complex copper salt-amine compounds the preparation of high-grade polymers must be carried out at low temperatures (e.g. in the range of 10° to 40° C.). At higher temperatures (e.g., higher than 50° C.) considerable amounts of quinones are formed, which compounds have a very unfavorable influence on the final properties of the polymers. The higher the percentage of quinones, the more strongly the polymer is colored and the less resistant it is to degrading influences.

In the process according to the present invention, the percentage of quinones formed is lower than when, at equal temperatures, use is made of complex copper salt-amine compounds.

On the one hand, the process of the present invention offers the advantage that it makes it possible to prepare polymers containing an extremely low percentage of quinones, and on the other hand it permits the use of higher temperatures. At higher temperatures higher reaction rates may be obtained, which is an advantage from a technological point of view. Moreover, at higher temperatures the water formed as a byproduct is removed more effectively. Besides, at higher temperatures use may be made as a reaction medium of solvents which are not suitable at lower temperatures. The process according to the present invention is of importance especially for technological reasons because the reaction conditions may be chosen from a far wider range.

The 2,6-disubstituted phenols which, according to the present invention, may be oxidized to high molecular weight polyarylene ethers are compounds having the formula:

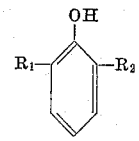

where $R_1$ and $R_2$ are identical or different alkyl, aryl, or aralkyl radicals. The polymer obtained if the process is started from 2,6-dimethyl phenol has very favorable properties, for which reason the use of this particular starting material is especially preferred.

The polymers obtained according to the present invention are per se known compounds which are suitable for a large number of applications. For their properties and fields of application, see the British Patent No. 930,993 cited above.

The amines which are suitable for the formation of the complex manganese salt-amine compounds and the complex cobalt salt-amine compounds used according to the present invention may have widely varying structures. They may be primary, secondary, or tertiary cyclic or non-cyclic amines. Further, they may be mono- or polyamines. Examples of the large number of suitable compounds are: pyridine, piperidine, homopiperidine, quinoline, triethylamine, dimethyllaurylamine, dimethylcyclohexylamine, diethylamine, tetramethylethylenediamine, n-hexylamine, and propylamine.

In the process according to the present invention the highest reaction rates are generally obtained if use is made of tertiary amines, so that it is generally preferred to use complex compounds of a manganese salt or a cobalt salt and a tertiary amine. It has been found that it is possible rapidly to obtain very high molecular weight polymers if use is made of a complex compound of a manganese salt or a cobalt salt and tetramethylethylenediamine, so that the use of such complex compounds is to be preferred.

The amount in which the amine is used in the process according to the present invention may vary between wide limits. Generally, very good results are obtained if the molar ratio of amine nitrogen to the manganese or the cobalt is higher than 5. Considerably larger amounts generally do not disturb the reaction, but are not to be recommended for reasons of economy. It is preferred to use such an amount that said ratio is about 10.

In the preparation of the complex manganese salt-amine compounds or the complex cobalt salt-amine compounds used according to the present invention, it is preferred to start (in the case of manganese) from manganese salts, such as manganous sulphate, manganous chloride, manganous bromide, manganous acetate, manganous butyrate, et cetera, or (in the case of cobalt) from cobalt salts, such as cobaltous sulphate, cobaltous chloride, cobaltous bromide, cobaltous acetate, cobaltous butyrate, etc.

Just as in the case of the amount of amine, the amount of manganese salt or cobalt salt may vary between wide limits. Generally, good results are obtained if use is made of the manganese compound or the cobalt compound in an amount of 1 to 8 mole percent, calculated on the 2,6-disubstituted phenol, so that it is preferred to use an amount in this range. Especially favorable results are obtained if the manganese compound or the cobalt compound is used in an amount of 4 mole percent.

The process according to the present invention is carried out in a solvent for the 2,6-disubstituted phenol used, which solvent is preferably also a solvent for the polymer. Suitable are, inter alia, aromatic solvents, such as benzene, toluene, xylenes, chlorobenzenes, benzonitrile, nitrobenzenes; halogenated alkanes and compounds such as dimethylformamide, dioxan, tetrahydrofuran, et cetera.

Preferably, the water formed during the reaction is removed from the reaction mixture. Suitable methods of so doing are well known to the man skilled in the art. The water may be removed, for instance, by distillation, by passing inert gases through the reaction mixture or by the use of desiccants, such as anhydrous magnesium sulphate or molecular sieves.

The oxygen used in the process according to the present invention may be pure oxygen. Alternatively, use may be made of a mixture of oxygen and inert gases, such as nitrogen or helium. For reasons of economy, it is preferred to use air. The reaction may be carried out in the presence of compounds which influence the reaction or the polymer. Such additives are known from the British Patent No. 930,993 cited above. Examples of suitable additives are anion exchangers, nitro-compounds, such as nitro-benzenes, peroxide-deactivating metals or metal oxides, adsorbents such as activated carbon, et cetera.

The reaction conditions to be employed in carrying out the process according to the present invention may generally be the same as for the preparation of high molecular polyarylene ethers under the influence of complex copper salt-amine compounds as described in British Patent No. 930,993. High grade products can be obtained in the process according to the present invention at temperatures which may generally be higher than those at which equally high grade products are obtained in the process according to the above-mentioned British patent.

The reaction mixture may be worked up by any of the methods described in the above-mentioned British patent.

It should be noted in passing that it is known from British Patent No. 930,933 to carry out the oxidative polymerization of phenols catalyzed by complex copper salt-amine compounds in the presence of manganese or cobalt or compounds thereof. These substances then serve as peroxide deactivators. There is no suggestion in the British patent, however, that as catalysts complex compounds of manganese (or cobalt) salts and amines can be used instead of the complex copper salt compounds.

It should further be noted that from a series of articles by Brackman and Havinga (Rec. Trav. Chem., 74, 949 (1955)) it is known to react an aqueous or alcoholic solution of phenol and methylamine or morpholine with oxygen in the presence of manganese or cobalt ions. According to these authors, however, the manganese or cobalt has under these conditions no catalytic effect. It is therefore surprising that contrary to what is disclosed in the literature, 2,6-disubstituted phenols can in an oxidation reaction which is carried out under the influence of complex manganese salt-amine compounds or complex cobalt salt-amine compounds and in the absence of copper compounds, be polymerized to high molecular weight polyarylene ethers.

In order to indicate still more fully the nature of the present invention, the following examples of typical procedures are set forth, it being understood, however, that this description is presented by way of illustration only, and not as limiting the scope of the invention.

*Example I (manganese)*

24.2 g. pure 2,6-dimethyl phenol are dissolved in 600 ml. pure benzene. To the resulting mixture 20 g. anhydrous magnesium sulphate, 1.0 g. anhydrous manganous chloride, and 16 g. dimethyllaurylamine are added. The mixture is heated to a temperature of 60° C., after which dry oxygen is passed therethrough, while the reaction vessel is being shaken and the temperature is maintained at 60° C. When no more oxygen is absorbed, the mixture is poured into 800 ml. methanol containing 20 ml. concentrated hydrochloric acid. The polymer formed then precipitates. It is filtered off, washed with methanol and dried. The yield is 91.8% by weight of the theoretical yield. The relative viscosity is 1.36, measured at 25° C. in a solution in chloroform containing 1 g. polymer per 100 ml. chloroform. The polymer is practically white.

If use is made of an equimolar amount of cuprous chloride instead of manganous chloride, then a polymer is obtained which is yellow.

*Example II (manganese)*

The procedure of Example I is repeated, use being made of 9 g. azacycloheptane (homopiperidine) instead of 16 g. dimethyllaurylamine.

Again a practically white polymer is obtained having a relative viscosity of 1.36. The yield is 80.3% of the theoretical yield.

*Example III (manganese)*

To 6.1 g. 2,6-dimethylphenol dissolved in 125 ml. pure benzene, 6 g. magnesium sulphate, 1.16 g. tetramethylethylenediamine and 0.25 g. anhydrous manganous chloride are added. Subsequently at 60° C. oxygen is passed therethrough with vigorous stirring. After 580 ml. oxygen have been absorbed, the reaction is stopped. The reaction mixture is poured into 200 ml. methanol containing 5 ml. concentrated hydrochloric acid. The polymer precipitated is removed by filtration, washed with methanol and dried. The relative viscosity of the colorless polymer thus obtained is 1.83.

*Example IV (cobalt)*

24.2 g. pure 2,6-dimethyl phenol are dissolved in 600 ml. pure benzene. To the resulting mixture 20 g. anhydrous magnesium sulphate, 1.0 g. anhydrous cobaltous chloride and 5 g. tetramethylethylenediamine are added. The mixture is heated to a temperature of 60° C., after which dry oxygen is passed therethrough, while the reaction vessel is being shaken and the temperature is maintained at 60° C. When no more oxygen is absorbed, the mixture is poured into 800 ml. methanol containing 20 ml. concentrated hydrochloric acid. The polymer formed then precipitates. It is filtered off, washed with methanol and dried. The yield is 93% by weight of the theoretical yield. The relative viscosity is 1.25, measured at 25° C. in a solution in chloroform containing 1 g. polymer per 100 ml. chloroform. The polymer is practically white.

If use is made of an equimolar amount of cuprous chloride instead of cobaltous chloride, then a copolymer is obtained which is yellow.

*Example V (cobalt)*

To 6.1 g. 2,6-dimethylphenol dissolved in 125 ml. pure benzene 6 g. magnesium sulphate, 2 g. n-hexylamine and 0.25 g. anhydrous cobaltous chloride are added. Subsequently, at 60° C. oxygen is passed therethrough with vigorous stirring. After 680 ml. oxygen have been absorbed, the reaction is stopped. The reaction mixture is poured into 200 ml. methanol containing 5 ml. concentrated hydrochloric acid. The polymer precipitated is removed by filtration, washed with methanol and dried. The relative viscosity of the colorless polymer thus obtained is 1.16.

While specific examples of preferred methods embodying the present invention have been set forth above, it will be understood that many changes and modifications may be made in the method of procedure without departing from the spirit of the invention. It will therefore be understood that the examples cited and the particular proportions and methods of operation set forth above are intended to be illustrative only, and are not intended to limit the scope of the invention.

What is claimed is:

1. In a process for the preparation of high molecular weight polyarylene ethers by reacting a 2,6-disubstituted phenol with oxygen in the presence of a complex metal salt-amine compound, the improvement which consists of using a complexing metal selected from the class consisting of manganese and cobalt, there being present no catalyzing amount of a complex copper, salt-amine compound.

2. A process according to claim 1, wherein the amine moiety of the complex is derived from a tertiary amine.

3. A process according to claim 2, wherein the tertiary amine is tetramethylethylenediamine.

4. A process according to claim 1, wherein the reaction medium contains an amount of 1 to 8 mole percent of the complexing metal, calculated on the 2,6-disubstituted phenol.

5. A process according to claim 4, wherein the amount of complexing metal is about 4 mols percent.

6. A process according to claim 1, wherein the molar ratio of amine nitrogen to the complexing metal is higher than 5.

7. A process according to claim 6, wherein the molar ratio of amine nitrogen to the complexing metal is about 10.

No references cited.

WILLIAM H. SHORT, *Primary Examiner.*

M. GOLDSTEIN, *Assistant Examiner.*